United States Patent [19]

Boegeman et al.

[11] Patent Number: 4,926,395

[45] Date of Patent: May 15, 1990

[54] METHOD AND SYSTEM FOR MEASURING SOUND VELOCITY

[75] Inventors: Dwight E. Boegeman; Carl D. Lowenstein, both of San Diego; Fred N. Spiess, La Jolla, all of Calif.

[73] Assignee: The Regents of the University of California, Berkeley, Calif.

[21] Appl. No.: 108,794

[22] Filed: Oct. 15, 1987

[51] Int. Cl.⁵ .......................................... G01H 29/00
[52] U.S. Cl. ..................................................... 367/89
[58] Field of Search ................ 367/99, 124, 125, 127, 367/902, 89; 73/597

[56] References Cited

U.S. PATENT DOCUMENTS

| | | |
|---|---|---|
| 3,257,638 | 6/1966 | Kritz et al. . |
| 3,258,737 | 6/1966 | Caivaglia . |
| 3,307,143 | 2/1967 | Wyse et al. . |
| 3,320,577 | 5/1967 | Wright . |
| 3,341,808 | 9/1967 | Levin et al. . |
| 3,388,372 | 6/1968 | De Witz . |
| 3,436,721 | 4/1969 | Farr . |
| 3,441,901 | 4/1969 | Cawley et al. . |
| 3,472,065 | 10/1969 | Maxwell . |
| 3,482,647 | 12/1969 | Lynch et al. .......................... 181/0.5 |
| 3,522,580 | 8/1970 | Lynch et al. . |
| 3,541,499 | 11/1970 | Lange . |
| 3,611,276 | 10/1971 | Massa . |
| 3,848,460 | 11/1974 | Bantz et al. . |
| 3,861,211 | 1/1975 | Dewan .............................. 73/194 A |
| 3,900,839 | 8/1975 | Lynch et al. . |
| 3,932,833 | 1/1976 | Massa et al. . |
| 3,943,870 | 3/1976 | Paslay .................................... 114/20 |
| 3,949,605 | 4/1976 | Stallworth et al. ................... 73/194 |
| 3,981,176 | 9/1976 | Jacobs ...................................... 73/24 |
| 4,038,629 | 7/1977 | van der Burgt et al. . |
| 4,059,987 | 11/1977 | Dowling et al. ................. 73/61.1 R |
| 4,080,837 | 3/1978 | Alexander et al. .............. 73/61.1 R |
| 4,094,193 | 6/1978 | Gerlach ............................ 73/170 A |
| 4,138,657 | 2/1979 | Shave . |
| 4,216,537 | 8/1980 | Delignieres ........................... 367/88 |
| 4,236,406 | 12/1980 | Reed et al. ........................ 73/61.1 R |
| 4,259,734 | 3/1981 | Harmel ................................. 367/101 |
| 4,429,994 | 2/1984 | Guagliardo et al. ................ 356/28.5 |
| 4,752,917 | 6/1988 | Dechape ............................. 367/125 |

Primary Examiner—Nelson Moskowitz
Assistant Examiner—Daniel T. Pihulic
Attorney, Agent, or Firm—Brown, Martin, Haller & McClain

[57] ABSTRACT

A method and system for determining the speed of sound in a fluidic medium by determining the travel time of an acoustical signal a predetermined distance in a fluidic medium by generating a cyclical reference signal of a predetermined frequency and transmitting a portion of the reference signal through the medium. The transmitted portion of the reference signal is received after travelling a predetermined distance in the fluidic medium. The cycles of the cyclical reference signal are counted during the period of time between the transmitting and receiving of the portion of the reference signal wherein the travel time of the portion of the reference signal, is the number of cycle counts divided by the frequency. The speed of the acoustical signal through the fluidic medium is a function of the path length divided by the travel time.

26 Claims, 4 Drawing Sheets

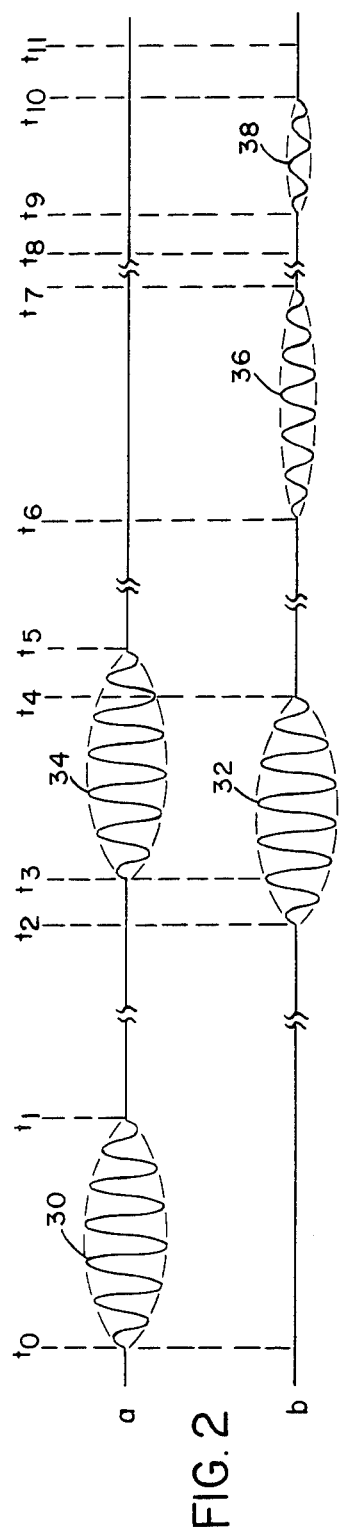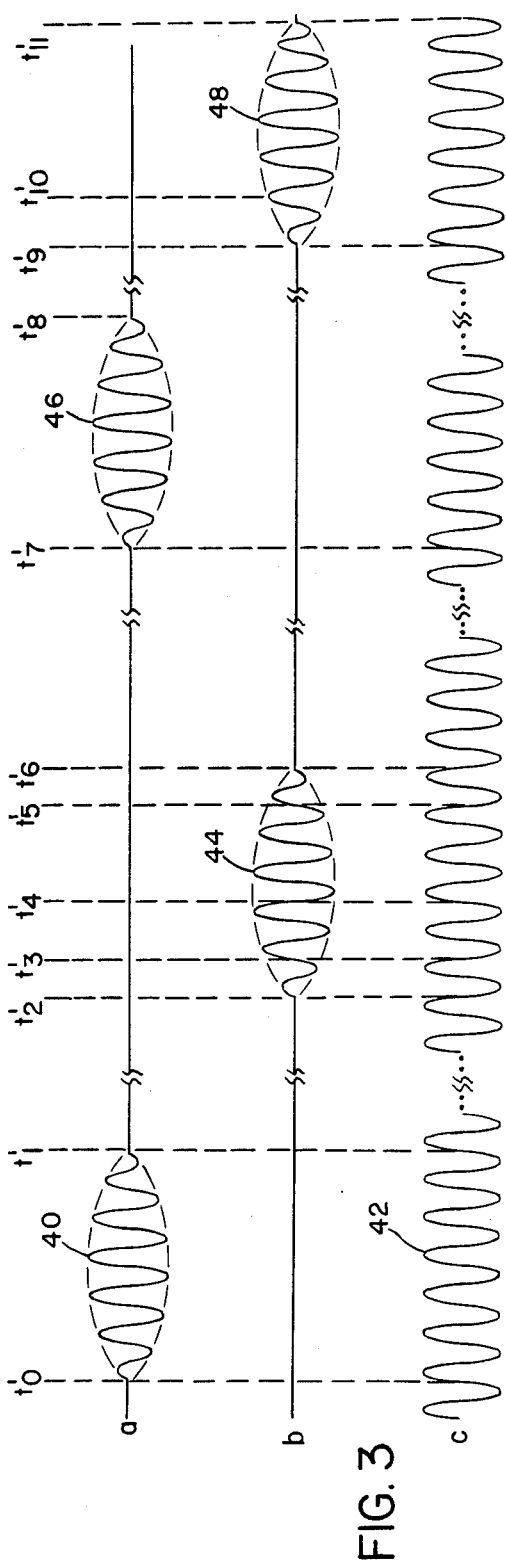

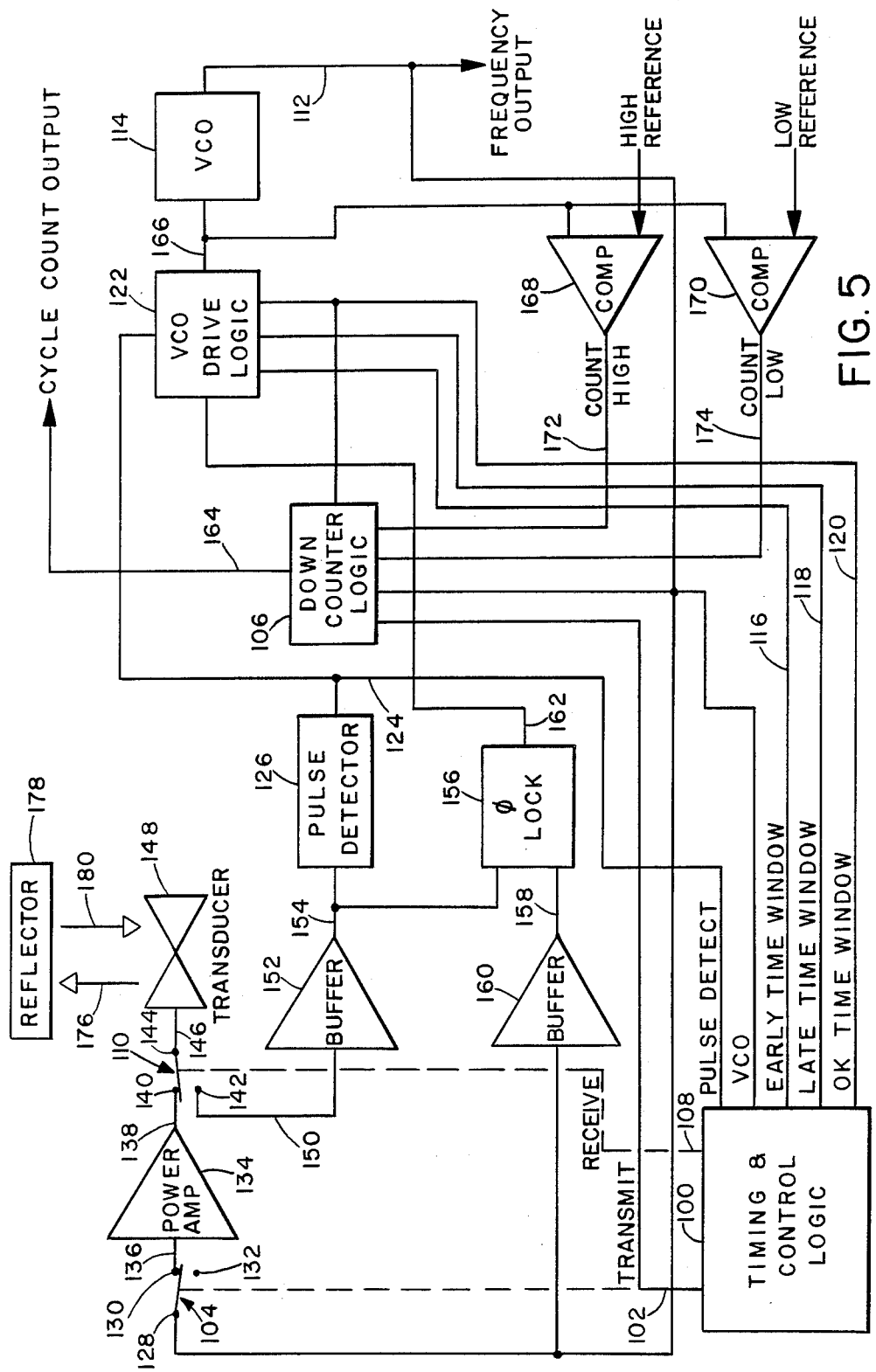

METHOD AND SYSTEM FOR MEASURING SOUND VELOCITY

This invention was made with Government support under Grant No. NAG5-320 awarded by the NASA. The Government has certain rights in this invention.

BACKGROUND OF THE INVENTION

I. Technical Field

The present invention relates to the measurement of sound velocity. More specifically, the present invention relates to a novel and improved method and apparatus for measuring sound velocity using a time-averaged, phase comparison process to accurately clock the travel time of a pulsed signal transmitted by a transceiver, reflected by a reflector and received at the transceiver.

II. Background Art

Ranging with acoustic signals is the primary method utilized for determining distance in the ocean and positions on the sea floor. The conversion of travel time measurements into distance requires accurate knowledge of the effective sound velocity along the sound propagation path. Currently, the most limiting factor in marine positioning accuracy is the uncertainty in the determination of the ocean's sound velocity field. Present day sea-going sound velocity meters typically have accuracies no better than one part in ten-thousand ($1:10^4$), which translates into position uncertainties of 100 centimeters in 10 kilometers.

The typical sound velocimeter commonly in use are of the sing-around type The sing-around type velocimeter operates by transmitting a pulsed sinusoidal signal, awaiting detection of the pulse reflection and triggering the transmission of the next pulse with the sequence repeated during the measurement The pulse repetition frequency measured is then related to sound velocity. The resolution of the sing-around type velocimeter is thereby limited by wavelength or frequency. Although the sing-around type sound velocimeter provides accuracy on the level of one part in $10^4$, extending the accuracy of sound velocity measurements with this type of sound velocimeter is quite limited. Although the first reflected echo is used to initiate a retransmit of the next pulse, there exist multiple echoes following the first reflected echo which may interfere with the next transmitted pulse. These following reflected echoes interfere with the next transmitted pulse and the first reflected echo of the next transmitted pulse thereby resulting in an apparent phase shift of the first reflected echo of the next transmitted pulse, thereby delaying recognition of the real echo. Furthermore, time delays occur in the detection of the first several cycles of the received echo pulse which delay the transmission of the next pulse.

It is, therefore, an object of the present invention to provide a new and improved method and system for measuring sound velocity.

SUMMARY OF THE INVENTION

The present invention is a novel and improved method and system for measuring sound velocity in a fluid medium such as water. In the present invention, under the control of a stable master oscillator a burst of several cycles is transmitted into a fluid as an acoustical signal. The signal travels through the fluidic medium until it is received sometime later at a receiver. The transmitting and receiving transducers may be the same unit by using a reflecting surface to redirect the transmitted signal back to the transducer.

The phase displacement between the received signal and the master oscillator is compared over a portion of the signals. The result of this comparison is used to adjust the frequency of the master oscillator so that the received signal is in phase with the transmitted signal. As a result of the frequency adjustment, the path length will then be an integer multiple of the wavelength.

The travel time of the signal between transmission and reception is measured as a multiple of the master oscillator period. As such, the number of oscillations between transmission and reception is counted. The count measurement is an exact integer result due to the previous frequency adjustment and the number of signal wavelengths in the transmission path. The travel time of the signal is then computed as a product of the master oscillator period, and the number of wavelengths in the path. Alternatively, a frequency divider can be used to divide the master oscillator frequency by the number of wavelength counts, thus to produce a signal with a period equal to the signal travel time. The direct measurement of propagation velocity is now derived as the quotient of the physical path length and the transmission time.

In accordance with the present invention, a method and apparatus for determining the travel time of a signal over a predetermined distance in a fluidic medium is disclosed. The invention comprises the generation of a cyclical reference signal of a predetermined frequency and transmitting a portion of the reference signal in the fluidic medium. The transmitted portion of the reference signal is received with the reference signal traveling a predetermined distance in the fluidic medium between transmission and reception. The number of cycles in the reference signal during the period of time between the transmission and reception of the portion of the reference signal is derived, wherein the cycle count divided by the predetermined frequency is the travel time of the portion of the reference signal in the fluidic medium when the phase of the received signal is substantially identical to that of the reference signal.

BRIEF DESCRIPTION OF THE DRAWINGS

These and other features, objects and advantages of the present invention will be more fully apparent from the detailed descriptions set forth below taken in conjunction with the drawings in which like reference characters identify correspondingly throughout and wherein:

FIG. 2 is a pulse timing diagram for a conventional sing-around type sound velocimeter;

FIG. 3 is a pulse timing diagram for a sound velocimeter of the present invention;

FIG. 5 is a block diagram of one circuit embodiment of the sound velocimeter of the present invention;

DETAILED DESCRIPTION OF THE PREFERRED EMBODIMENTS

Figure 1:
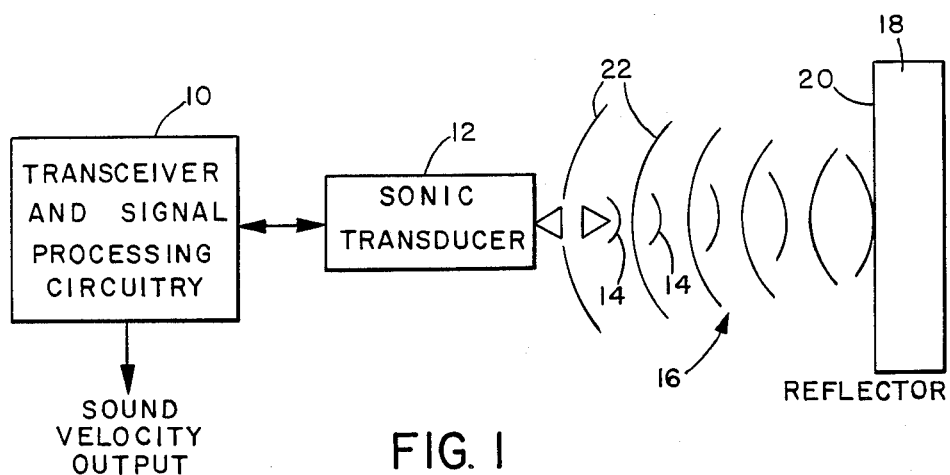
FIG. 1 is a diagrammatic illustration of a sound velocimeter arrangement.

The present invention comprises a novel and improved method and system for measuring sound velocity in a fluid such as water. FIG. 1 illustrates in block diagram form a typical configuration and environment for a sound velocimeter. In FIG. 1, a transceiver and signal processing circuitry 10 generates an electrical pulsed sinusoidal signal that is coupled to sonic transducer 12. Sonic transducer 12 receives the pulsed signal and converts the signal into a corresponding acoustical signal. Sonic transducer 12 transmits the sonic signal indicated by the lines 14, through medium 16 towards reflector 18. Reflector 18 reflects the pulsed signal from a surface 20 with the resultant reflected pulsed signal, as indicated by the lines 22 as an echo signal, is returned towards sonic transducer 12. Sonic transducer 12 converts the received echo signal into an electrical signal. The electrical signal is coupled to transceiver and signal processing circuitry 10 where certain parameters are measured, as discussed herein, and used to determine sound velocity.

In a conventional sing-around type sound velocimeter, a gated sinusoidal signal is generated by transceiver and signal processing circuitry 10 and coupled to sonic transducer 12. Sonic transducer 12 converts the gated signal from an electrical signal into a corresponding acoustical signal. Due to the inherent characteristics of the sonic transducer crystal, a rise and fall time is associated with the pulse output from transducer 12. Referring to FIG. 2, it is seen in FIG. 2a, at time $t_0$–$t_1$, sonic transducer generates an acoustical signal pulse 30 of a constant frequency. Due to the transducer crystal characteristics, the rise and fall times of pulse as illustrated gives the envelope of pulse 30 an elliptical shape.

Transmitted pulse 30 is directed towards the velocimeter reflector which reflects the transmitted pulse 30 back towards the transducer. The reflected pulse, pulse 32, is illustrated in FIG. 2b. The echo pulse is received by the transducer at time $t_2$. However, due to the low amplitude of the pulse 32, the transceiver and signal processing circuitry is unable to detect pulse 32 until, for example the second cycle of the pulse, when the pulse is of a sufficient detection amplitude. Pulse 32 is detected at a time $t_3$. Upon pulse detection, transceiver and signal processing circuitry simultaneously generates a second pulse for transmission, pulse 34. Pulse 34 is transmitted during the period $t_3$–$t_5$ and is of typically identical frequency, duration and pulse envelope as pulse 30.

In the conventional sing-around type sound velocimeter, the retransmission of a pulse occurs upon the detection of the reflected echo pulse of the proceeding transmitted pulse. This transmit, receive, and retransmit upon receiving scenario enables a pulse repetition frequency measurement to be made. It is this pulse repetition frequency that is related to sound velocity.

However, a transmitted pulse may develop more than just a single reflected echo pulse. For example, as illustrated in FIGS. 2a and 2b, the reflection of transmitted pulse 30 results in the generation of a primary echo pulse 32. In addition to pulse 32, multiple reflections or echo pulses, such as illustrated by pulses 36 and 38 which respectively occur during the time periods $t_6$–$t_7$ and $t_9$–$t_{10}$ occur. Echo pulses 36 and 38 are of a much less magnitude than pulse 32 but can have an effect upon subsequently transmitted pulses and their primary echo pulses. As illustrated in Graph 2b, the echo pulses 36 and 38 are of greatly reduced amplitude such that, for example, although the actual echo signal should be of an identical duration, i.e. $t_2$–$t_4 = t_6$–$t_7 = t_8$–$t_{11}$, the pulse 38 is only detectable during the time period $t_9$–$t_{10}$. It is the reflected echo pulses such as pulses 36 and 38 which may interfere with the first reflected or primary echo pulse of the next transmitted pulse. This interference may result in an apparent phase shift of the subsequent first echo pulse, thereby delaying recognition of the actual first echo pulse. This interference can result in an erroneous pulse repetition frequency that may adversely affect the accuracy of the overall sound velocity measurement.

In the present invention, a sound velocimeter is disclosed which is an extension of the conventional sing-around concept. The present invention utilizes a time-average, phase comparison process to more accurately clock the roundtrip travel time between the transducer and reflector. FIGS. 3 and 3b illustrate pulse transmission and echo pulse reception timing similar to that of FIG. 2. FIG. 3a illustrates the transmitted pulses while FIG. 3b illustrates the received echo pulses. FIG. 3c illustrates the master oscillator.

In FIG. 3a at the time $t'_0$–$t'_1$, pulse 40 is transmitted as an acoustic signal similar to that of pulse 30 of FIG. 2a. Pulse 40 is generated from the system master oscillator (FIG. 3c) during the time period $t'_0$–$t'_1$. The phase and frequency of the master oscillator signal 42 and pulse 40 are identical, with the envelope of pulse 40 being generally elliptical in shape. Although pulse 40 is illustrated in FIG. 3 as consisting of six cycles for purposes of illustration only, typically a larger number of cycles comprise the actual pulse signal which result in an elongated elliptical envelope shape.

The transmitted pulse 40 is reflected by the reflector and arrives as pulse 44 at the transducer at a time $t'_2$. As illustrated in FIG. 3b, reflected pulse 44 exists during the time period $t'_2$–$t'_4$. The phase of the sinusoidal component of pulse 44 is compared with the continuously running master oscillator signal 42. In the examples illustrated in FIG. 3, the phase of pulse 44 is shifted by 180 degrees. During the time $t'_2$–$t'_4$, a single cycle of the sinusoidal signal of pulse 44 occurs with the cycle beginning at time $t'_2$ at zero degrees. By comparison the master oscillator signal phase time $t'_2$ is at 180 degrees. The circuitry utilized in the present invention anticipates the arrival time of the reflected pulse in addition to comparing the phase of the sinusoidal signal of pulse 44 with the master oscillator signal 42 to detect a phase difference therebetween. In detecting an early or late arrival of the reflected pulse, or a phase error such as in the case of FIG. 3, the circuit adjust the frequency of master oscillator signal 42, such as during time period $t'_4$–$t'_5$, to a different frequency.

After a time period of a significant duration, time $t'_6$–$t'_7$, has elapsed, the next pulse, pulse 46, of a sinusoidal signal is transmitted. Pulse 46 is the pulsed sinusoidal signal of adjusted frequency of the master oscillator. Pulse 46 is reflected and received at the transducer during the time period $t'_9$–$t'_{11}$ as pulse 48. A comparison of the sinusoidal signal forming pulse 48 is made with the master oscillator to determine if a phase difference exists. As illustrated in FIG. 3, pulse 48 is in phase with master oscillator signal 42 during the period $t'_9$–$t'_{11}$. Due to amplitude detection levels, the actual detection of pulse 48 occurs at a time $t_{10}$ during the second cycle of pulse 48.

With the signal forming the transmitted pulse and the signal forming the received pulse both in phase with the master oscillator, the travel time of signal (or sound) in the medium is a function of the oscillator frequency and the number of cycles occurring between the beginning of the transmitted pulse and the detection of the received pulse. For example, the time of interest is that from $t'_7-t'_{10}$. By counting the number of master oscillator cycles between the transmission time $t'_7$ and the detection of the reflection pulse at time $t'_{10}$ minus a one cycle correction, total cycle count divided by the frequency of the master oscillator results in the signal travel time. Since the received pulse is not detected until the second cycle of the pulse, for example, at time $t'_{10}$, this single cycle error is consistent in the measurements and is corrected by subtracting one cycle count from the total cycle count between the time period $t'_7-t'_{10}$.

Figure 4:
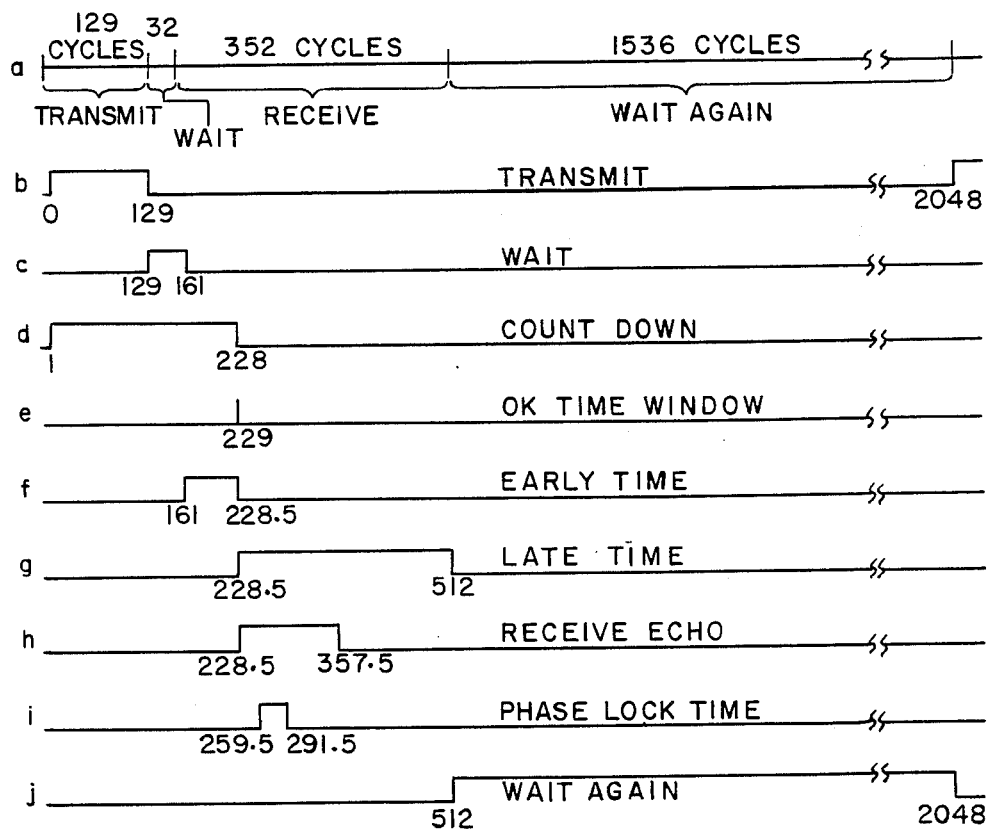
FIG. 4 is an overall system timing diagram for the sound velocimeter of the present invention.

FIG. 4 illustrates in FIGS. 4a–4j, the timing diagram for the operation of the system. FIG. 4a illustrates the four-part timing cycle as established in the present invention. In FIG. 4a, the four-part timing cycle is a function of the master oscillator frequency. In FIG. 4a, the sequence is begun by TRANSMIT period of 129 master oscillator cycles which is then followed by a 32 cycle WAIT period. The WAIT period is followed by a 352 cycle RECEIVE period. Following the receive period is a WAIT AGAIN period of 1,536 cycles. At the 2,048th master oscillator cycle, the four-part timing sequence is repeated.

With reference to FIGS. 4b–4j, reference is made to the cycle numbers of a master oscillator. In FIG. 4b, the transmit sequence begins at the beginning of a master oscillator or voltage controlled oscillator (VCO) cycle with the beginning of the first cycle marked 0. During the TRANSMIT cycle, 129 cycles from the VCO are sent to the transducer. The TRANSMIT period ends at the end of the 129th cycle. A WAIT period occurs as illustrated in FIG. 4c from the 129th cycle through the 161st cycle. A countdown, as illustrated in FIG. 4d, begins in the second cycle of the transmitted pulse. The countdown continues through the WAIT period of FIG. 4c and ends in a first part of the receive cycle of FIG. 4a, at the end of the 228th cycle period.

At the end of the 228th cycle and through the end of the 229th cycle a one cycle wide OK time window is generated. The detection of the received echo pulse is expected to occur within this OK time window. However, the detection of the received echo pulse may occur in the receive period before the OK time window, i.e. in an early time window from cycles 161 through 228.5. The EARLY time window is illustrated in FIG. 4f. Furthermore, the detection of the received echo pulse may occur after the OK time window, i.e. in a LATE time window from cycles 228.5 through 512. The LATE time window is illustrated in FIG. 4g. If the detection of the received echo pulse occurs during the EARLY or LATE time window, the frequency of the voltage controlled oscillator is respectively increased or decreased to bring the detection of the received echo pulse within the one cycle wide OK time window.

Once the echo pulse is detected within the OK time window, a phase lock loop compares the phase of the oscillator output with 32 cycles of the echo pulse. The phase lock loop provides minor voltage adjustment to the drive voltage controlling the VCO to fine-tune the frequency of the oscillator. This phase matching technique permits roundtrip travel time to be clocked with an accuracy greater than first cycle identification only.

FIG. 4h illustrates a RECEIVE ECHO time window beginning at cycle 228.5 through cycle 357.5 in which the transmitted pulse of 129 cycles is expected to be received as the echo pulse when the echo pulse is detected during the OK time window. FIG. 4i illustrates the 32 cycle PHASE LOCK TIME in which the comparison of the VCO output phase is made with the phase of the received echo pulse with the comparison occurring during cycle 259.5 through cycle 291.5. FIG. 4j illustrates the beginning of a WAIT AGAIN period which begins at the end of the 512th cycle and continues through the 2048th cycle. The purpose for the WAIT AGAIN period before retransmitting permits multiple echo reflections to fade out before transmission of a next pulse.

The countdown between the TRANSMIT and OK TIME WINDOW can be modified so as to yield a range of oscillator operating frequencies to result in a correct phase lock. Since the countdown represents the integral number of cycles between the second cycle of transmit and the second cycle of receive, the first cycle being lost in the noise, a different operating frequency is attained for each countdown setting. The count divided by the resulting frequency, however, yields travel time, which should be a constant independent of the countdown setting or frequency.

FIG. 5 illustrates in block diagram form the circuitry required for obtaining data, i.e. frequency and cycle count necessary for computing travel time of a transmitted signal over a predetermined distance. Knowing the travel time and the distance over which an acoustical signal travels, sound velocity may be readily derived therefrom.

In FIG. 5, the system is controlled by timing and control logic 100. Logic 100 is coupled by line 102 to switch 104, which is typically a FET transistor, and down counter logic 106. Control logic 100 is also coupled by line 108 to switch 110 which is also typically a FET transistor. Logic 100 is also coupled by line 112 to the output of voltage control oscillator (VCO) 114. Logic 100 is furthermore coupled by lines 116, 118 and 120 to VCO drive logic 122. In addition, logic 100 is coupled by line 124 to the output of pulse detector 126.

The output of VCO 114 is coupled by line 112 to an input terminal 128 of switch 104. Switch 104 is controlled by a transmit signal on line 102 from logic 100 which selectively couples terminal 128 to either output terminals 130 or 132 of switch 104. Although switch 104 is illustrated in FIG. 5 as a relay-type switch for purposes of illustration only, it is well known to one skilled in the art the adaptation of a transistorized switch for switch 104. Terminal 130 is coupled to the input of power amplifier 134 by line 136. The output of power amplifier 134 is coupled by line 138 to terminal 140 of switch 110. Switch 110 also has terminals 142 and 144 with terminal 144 coupled by line 146 to transducer 148 and terminal 142 coupled by line 150 to the input of buffer 152. Switch 110 selectively couples, in response to a signal on line 108, terminal 144 to either terminal 140 or terminal 142. Again, although switch 110 is described as a relay-type switch for purposes of illustration only, it is readily understood by one skilled in the art that a FET switching arrangement may be employed therefor.

The output of buffer of 152 is coupled by line 154 to the input of pulse detector 126 and one input of phase lock circuit 156. The other input of phase lock circuit 156 is coupled by line 158 to the output of buffer 160. The input of buffer 160 is coupled by line 112 to the output of VCO 114. The output of phase lock circuit 156 is also coupled by line 162 to an input of logic 122.

The output of detector 126 is coupled by line 124 as an input to logic 100 and logic 122. Down counter logic 106 also has the output of VCO 114 coupled as an input thereto by line 112. Logic 106 provides as an output on line 164 a cycle count output signal. Logic 122 receives input signals from logic 100 on lines 116 and 118 in addition to an input signal on line 120 from logic 106. In addition logic 122 receives an input signal from phase lock circuit 156 on line 162. Logic 122 provides a VCO drive output signal on line 166 to the input of VCO 114. Line 166 is also coupled to an input of comparator 168 and an input of comparator 170. The other input of comparator 168 is coupled to a voltage source (not shown) which sets a high count reference voltage. Similarly, the other input of comparator 170 is coupled to a voltage source (not shown) which establishes a low count reference voltage. The outputs of comparators 168 and 170 are respectively coupled by lines 172 and 174 as inputs to logic 106.

With reference now to FIGS. 3, 4 and 5, the operation of the system is now described. The LOW REFERENCE voltage and the HIGH REFERENCE voltage are used with the VCO drive voltage on line 166 to establish in comparators 168 and 170 signals on lines 172 and 174 which select a count down number in logic 106. This count down number is selected according to the number of cycle counts needed to bring the OK time window within the echo pulse reception.

During the operation of the system, at time t'₀ logic 100 generates a transmit control signal on line 102 which begins logic 106 counting down, one count per cycle from the selected count down number, for example 228, for each cycle output from VCO 114 that is input on line 112 to counter 106. The transmit control signal on line 102 closes switch 104 such that terminal 128 is coupled to terminal 130. Therefore, the output of VCO 114 is coupled on line 112 through switch 104 to and on line 136 to the input of power amplifier 134. Power amplifier 134 amplifies the VCO output signal for transmission. Amplifier 134 provides an output on line 138 to transducer 148. The signal on line 138 is coupled from terminal 140 which is coupled by switch 110 to terminal 144 and on line 146 to transducer 148. Transducer 148 generates a pulsed signal similar to that of pulse 40 of FIG. 3. At time ti logic 100 changes the transmit control signal on line 102 such that switch 104 disengages the output of VCO 114 from the input of power amplifier 134 by switching the coupling of terminal 128 from terminal 130 to terminal 132.

The transmitted signal pulse is coupled through the medium along path 176 where it reflects off reflector 178. The reflected signal pulse returns along path 180 towards transducer 148 as an echo pulse. In accordance with the timing diagram of FIG. 4, a receive control signal is generated at the beginning of the RECEIVE period and coupled on line 108 to switch 110. In response thereto, switch 110 couples terminal 144 to terminal 142. During the RECEIVE period, logic 100 generates an early time window signal that is coupled on line 116 to logic 122. Logic 100 also generates a late time window signal that is coupled on line 118 to logic 122. The early and late time window signals are used to set the drive voltage level input to VCO 114. Should the received pulse be received during either the early time window or late time window, logic 122 adjusts the voltage output on line 166 to the input of VCO 114 to increase or decrease the oscillator frequency.

The received pulse is coupled from transducer 148 through switch 110 to buffer 152. The output of buffer 152 is coupled to the input of detector 126 where detection of the signal occurs. Upon detection of the received pulse, detector 126 provides an output signal to logic 122.

Logic 106 counts down from the selected countdown number upon receiving the transmit control signal. When logic 106 reaches a count out number such as 0, it generates an OK time window signal. The OK time window signal is coupled on line 120 to logic 100 and logic 122. Logic 100 uses the OK time window signal, which is a one cycle long, to end the early time window signal and begin the late time window signal. The selected cycle count number is provided as a cycle count output on line 164.

The output of buffer 152 is also coupled to one input of phase lock circuit 156. The output of VCO 114 is coupled to another input of phase lock circuit 156 through buffer 160. Phase lock circuit 156 compares the phase of the output frequency from VCO 114 to that of the received pulse. Phase comparison circuit 156 provides a phase comparison signal on line 162 to logic 122. The output from detector 126 is also provided on line 124 to logic 122 and logic 100. The pulse detect signal on line 124 is coupled to logic 122 such that in combination with the signals on lines 116, 118, 120 and 162 to determine the window in which the transmitted signal is received and the phase comparison information.

Generally, the outputs from comparators 168 and 170 provide a coarse adjustment in logic 122 in setting the control voltage on line 166 to VCO 114 and the VCO frequency. The signal on line 162 provides a fine adjustment signal to logic 122 and is used in setting the control voltage on line 166 to VCO 114 when the received pulse is within the OK time window.

When the pulse is received outside of the OK time window, logic 122 in response to the early time window signal or late time window signal on lines 116 and 118 adjusts the drive voltage on line 166 to correspondingly increase or decrease the output frequency of VCO 114. However, it is the countdown number selected in logic 106, as a result of the output of comparators 168 and 170, that determines the OK time window and respectively beginning and ending the early and late time windows. The setting of the OK time window at a particular cycle count therefore sets the window in which the pulse is received resulting in a coarse VCO frequency adjustment. Logic 106 contains an up-down counter that is adjusted by the output of comparators 168 and 170 to select the countdown number. Changing of the countdown numbers limits the frequency of VCO to keep the output frequency within the resonance range of the transducer crystal. For example, the countdown number selected places the received pulse in the late time window. However, a straight adjustment to the VCO drive voltage would take the VCO output frequency out of the transducer crystal operation range. By selecting a larger countdown number the OK time window is delayed due to the cycle countdown number increase. Therefore, no major frequency adjustment is required and the travel time is a function of the new countdown number or cycle count. A subsequent pulse is transmitted and the receiving timing of the received pulse is compared t that with the time windows.

The output from phase lock circuit 156 is used to fine adjust the output voltage on line 166 from logic 122 when the received pulse is within the OK time window. If the pulse detect signal is received by logic 122 during the period of time the OK window signal is provided to logic 122, the output from phase lock circuit 156 is used to slightly increase or decrease the VCO output frequency. The next transmitted pulse, a frequency adjusted pulse is transmitted, received and compared with the phase of the VCO output signal. The phase matched pulse being received within the OK time window, a valid sound velocity measurement frequency is achieved. Upon obtaining the measurement frequency, subsequent measurement pulses are transmitted with the time between transmission of the pulse and the reception of the echo being an integral number of cycles between the second cycle of the transmit signal and the second cycle of the receive pulse. The second cycle of the pulses is used due to the first cycle of the receive pulse being lost in the noise.

It should be noted that logic 106 begins the countdown on the second cycle following the initiation of the transmit signal. Due to noise levels, detector 126 is only able to detect the second cycle in the received pulse.

The system of the present invention may be constructed by using a single transducer, folded path probe. Although a folded path probe is preferred, it is envisioned that one may construct separate transducers, one for transmitting the pulse and another for receiving the pulse, separated by a known distance and sharing common timing signals. In the system of the present invention, a transducer probe was constructed from a conventional sing-around type probe using a single transducer, folded path probe having a transducer crystal resonant near 4 Megahertz with the total path length from crystal to reflector and back at approximately 8.5 centimeters. It is preferred that a baffle be added surrounding the transducer face to limit multiple echos.

In accordance with the present invention, upon achieving phase lock between the transmitted and received signals, an integral number of cycles between the second cycles of the transmit and receive pulse may be counted as a function of the countdown number. Since the frequency of the VCO is known and the number of counts between the transmitted and received pulse is also known, the travel time of the signal may be determined therefrom. To determined sound velocity from the operating frequency and counts, two unknowns must be modeled. These unknowns are path length and electronic delays. The equation relating frequency to sound velocity is:

$$\frac{count}{frequency} = traveltime = \frac{L(1 + \alpha T)}{C} + B \quad (1)$$

where:
L is the path length;
α is the thermal coefficient of expansion;
C is sound velocity; and
B is the electronic delay which may be modeled as a function of temperature and frequency.

The least squares fit of path length (L) with temperature and electronic delay (B) with temperature and frequency, yield estimates of L, α, and all time delay coefficients.

The path length and thermal coefficients of expansion may be measured indirectly during calibration of the probe. Changing the path length by a precisely known amount and measuring the resulting change in travel time will produce an independent estimate of path length. The estimate of path length may be determined by the equation:

$$\frac{L}{t - B} = \frac{\delta L}{\delta t} \quad (2)$$

where:
L is the path length;
t is the travel time; and
B is the electronic delay.

In one calibration setup, the path length was changed by using gage blocks of a 0.02 μ meter widths.

The velocimeter, constructed as described above, was calibrated inside a temperature controlled water bath in a chill room. The room was cooled to a temperature of 4° C. and remained between 4°-6° C. for the duration of the experiment. The velocimeter was positioned in a plastic tank filled with 1 M Ω pure water. This assembly was suspended in a stirred outer water bath which is in turn surrounded by glycol circulating continuously through refrigeration coils. Rheostat controlled heater blades were positioned in both the glycol and outer water baths.

The calibration tank was constructed as an air-tight and water-tight box in size of approximately 10 inches wide by 5 inches deep by 19 inches high. The probe was suspended about 9 inches deep from a top cover. A platinum resistance thermometer was used to measure the temperature perpendicularly alongside the sound path, with the axis of the sound path at the mid-point of the platinum resistance thermometer. Water was drawn off of the bottom of the tank with fresh 1 Meg ohm water added at the surface as needed. Nitrogen blankets the top of the tank to keep the water from absorbing carbon dioxide which could raise the impurity level. The temperature of the pure water is measured to 0.001° C. accuracy on a Mueller bridge located outside of the tank in a laboratory. The sound velocimeter electronics in this experimental setup were positioned in the laboratory outside the chill room.

In calibrating the instrument, all refrigeration units were turned on cooling the bath to 0° C., the glycol to −4.45° C. and the chill room to 4.2° C. Then the heater blades were turned on in the glycol and outer bath to reach a starting temperature of nearly 30° C. After the bath temperature had stabilized and the frequency velocimeter frequency was changing by approximately only 1 part in 106, temperature and frequency measurements were taken. A minimum of ten sets of simultaneous platinum resistance thermometer bridge readings and frequency measurements were taken at each temperature for a mid-range of counter settings. In addition, a minimum of six sets of data were taken for ten to twenty different counter settings at each temperature. The platinum resistance thermometer bridge measurements were taken with current flowing alternately in a normal and reverse sense. Data were taken from 28° C. to 2° C., decreasing by approximately 3° C. increments. Additional measurements were made with the shorter path length at four different temperatures: 28° C., 20° C., 10° C. and 0° C. Before and after measurements were taken at each temperature, the water purity was monitored by drawing water off the bottom and pumping it through a 200K ohm resistance meter. Throughout the calibration procedure a nitrogen blanket was kept over the pure water, and the water level above the probe was monitored in order to compensate for any possible effects of water pressure on sound velocity and path length.

Figures 6, 7, 8:
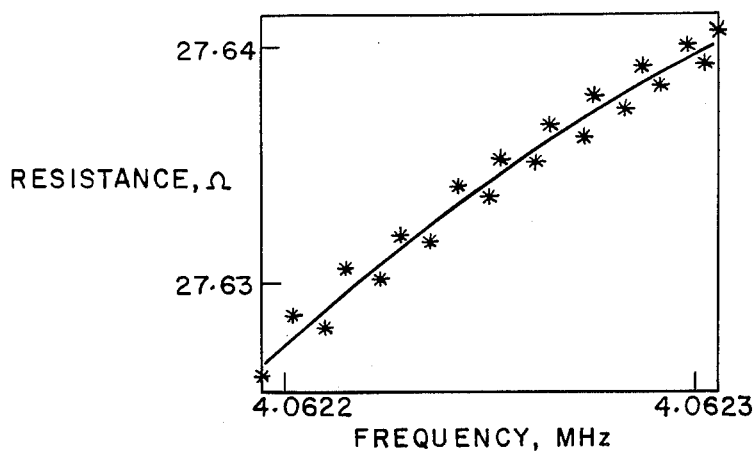
FIG. 6 is a graph of system calibration data for frequency versus resistance.
FIG. 7 is a graph of system calibration data for count versus delay.
FIG. 8 is a graph of system calibration data for frequency times temperature versus delay.

Since it is difficult to hold the temperature in the bath exactly constant, data was taken as the temperatures increased or decreased over a small range. A least squares fit of bridge resistance to operating frequency (which also increases or decreases slowly in response to the temperature drift) smoothes the data. From the least squares fit, the average resistance and frequency are calculated as illustrated in FIG. 6. The double rows of data in FIG. 6 are the result of an approximately constant offset between normal and reverse bridge readings. The average between each pair of data points is the correct bridge resistance for that temperature, in the 1968 temperature scale. The mean square error of fits to all the normal readings and reverse readings separately was approximately 0.0001 ohms. This translates to a temperature uncertainty of approximately 0.001° C. or better than one part in $10^5$ in sound velocity.

Sound velocity may be calculated from the temperature data to less than 3 parts in 105 using the equation:

$$C = 1402.3876 + 5.037111\ T - 5.808522 \times 10^{-2}\ T^2 + \quad (3)$$
$$3.341988 \times 10^{-4}\ T^3 - 1.478004 \times 10^{-6}\ T^4 + 3.14643 \times 10^{-9}\ T^5.$$

where:
C is sound velocity; and
T is temperature in degrees C.

A correction is then made to the sound velocity due to the weight of the water above the probe, using the following equation:

$$C_o = C_p - (0.153563 + 6.8982 \times 10^{-4}\ T - 8.1788 \times 10^{-6}\ T^2)P \quad (4)$$

where:
$C_o$ is the sound speed in pure water;
$C_p$ is uncorrected sound velocity;
T is temperature in degree C.; and
P is pressure in bars.

The corrected data was barely significant at the part in $10^5$ level, as can be seen in the data of Table 1.

TABLE 1

| Resistance, Temperature and Sound Velocity Data | | | |
|---|---|---|---|
| Resistance | Temperature | Sound Velocity | C, corrected |
| 28.49574 | 28.7430 | 1506.1705 | 1506.1671 |
| 28.50088 | 28.7939 | 1506.2922 | 1506.2888 |
| 28.16209 | 25.4442 | 1497.8673 | 1497.8639 |
| 27.65408 | 20.4278 | 1483.6488 | 1483.6454 |
| 27.30755 | 17.0104 | 1472.7894 | 1472.7861 |
| 26.95488 | 13.5361 | 1460.7084 | 1460.7051 |
| 26.67964 | 10.8272 | 1450.5203 | 1450.5170 |
| 26.26816 | 6.7815 | 1433.9765 | 1433.9733 |
| 25.84978 | 2.6731 | 1415.4434 | 1415.4402 |

The effects of water pressure on path length, due to linear compression and bowing, are negligible in this case. However, these factors will be significant at higher pressures in the ocean. The path length does need to be corrected for thermal expansion. The probe as constructed in the present invention has a roundtrip path length defined as 8.6108 cm at 0° C., it has a thermal coefficient of expansion at $15 \times 10^{-6}$ per degree C. A gage block was used to shorten the path length exactly 5 mm wide at 20° C. The gage block has a thermal coefficient of expansion of $8.5 \times 10^{-6}$ per degree C. The resultant path lengths at each temperature are set forth in Table 2. The travel times listed in Table 2 include electronic delay time. To calculate this delay, the theoretical travel time, length divided by sound velocity, is subtracted from the actual travel time listed in Table 2.

TABLE 2

| Path Length and Time Delay Data | | | | |
|---|---|---|---|---|
| Count | Frequency, MHz | Travel Time, μsec | Length, cm | Delay, μsec |
| 220 | 3.823629 | 57.536962 | 8.614513 | 0.3420299 |
| 220 | 3.823889 | 57.533050 | 8.614519 | 0.3426958 |
| 220 | 3.803155 | 57.846708 | 8.614409 | 0.3375712 |
| 220 | 3.767857 | 58.389627 | 8.613439 | 0.3327128 |
| 220 | 3.740929 | 58.808921 | 8.612997 | 0.3279440 |
| 220 | 3.710862 | 59.285416 | 8.612548 | 0.3238364 |
| 220 | 3.784913 | 59.710751 | 8.612198 | 0.3374517 |
| 226 | 3.742440 | 60.388409 | 8.611676 | 0.3337622 |
| 230 | 3.758015 | 61.202523 | 8.611145 | 0.3653008 |

Before modeling the electronic delays as a function of frequency and temperature, the delays were normalized to the same count value, 220. This normalization was achieved by running a least squares fit on the set of data taken over a range of manually selected countdown numbers at 28° C. FIG. 7 illustrates the least squares fit plot of data for normalization. The normalization is required to account for electronic delays which are a known fraction of a cycle and accumulate additively.

The scaled delays were modeled as functions of frequency and temperature. The nonzero quadratic thermal coefficient of expansion, B, would look like an electronic delay that was of a function $T^2/C$ according to the equation:

$$\frac{\text{count}}{\text{frequency}} = \frac{L(1 + \alpha T)}{C} + \frac{\delta\ T^2}{C} \quad (5)$$

where:
$B = \delta/L$.

A least squares fit of scaled delay to $T^2/C$, however, had an rms misfit of 0.0015 usec which is equivalent to an error in sound velocity of 4 parts in $10^4$.

Phase shifts due to the transducer operating over a range of frequencies near resonance would look like an electronic delay which was a function of the product of frequency and temperature. A least squares fit of scaled delays to frequency times temperature is shown in FIG. 8 which models the electronic delays quite well with an rms misfit of only 0.00048 μsec, or less than a part in $10^5$ of sound velocity. Further fits of the remaining delay with frequency and temperature individually do not improve the fit.

Therefore, the best equation relating operating frequency of the velocimeter of the present invention to sound velocity is given by the equation:

$$C_c = \frac{L(1 + \alpha T)}{\frac{\text{count}}{\text{frequency}} - B} \quad (6)$$

where:
$\alpha = 15 \times 10^{-6}$ per degree C.;
L = 8.6108 cm; and
B is calculated from the equation:
$B = 0.3175984 + 0.2847424 \times 10^{-2}$
     $\text{count} + 0.3026129 \times 10^{-3}\ \text{frequency} \times \text{temperature}$ An independent estimate of path length may be obtained using the data over shorter path lengths. Equation (2) was used to calculate total path length at each temperature with the results given in Table 3.

TABLE 3

| Independent Estimate of Path Length Using Gage Blocks | | |
|---|---|---|
| Temperature | Length, cm | Length at 0° C. |
| 28.6912 | 8.61987 | 8.61503 |
| 20.2372 | 8.63893 | 8.64157 |
| 10.6522 | 8.64295 | 8.63632 |
| −0.0408 | 8.61503 | 8.61617 |

In order to know the change in path length exactly, the gage block must be attached to the reflector on the probe with a gap less than 0.02 $\mu$meters.

The standard error of estimate, s, for equation (6) relating sound speed to operating frequency is given by the equation:

$$s = \left[ \frac{(C_c - C_o)2}{p - q} \right]^{\frac{1}{2}} \quad (8)$$

where:
$C_c$ is the sound speed calculated from the velocimeter;
$C_o$ is the sound speed in pure water;
p is the number of data points; and
q is the number of independent coefficients or one plus the order of the independent variable.

The resulting standard error of estimate for equation (6) is 0.013 m/sec, which is slightly better than one part in $10^5$ of sound velocity. Therefore, the present invention discloses a novel system and method for measuring sound velocity to at least one part in $10^5$. The sound velocimeter of the present invention may now be used in saline solutions to measure sound velocity where empirical equations are lacking in sufficient accuracy to measure sound velocity better than one part in $10^5$.

The previous description of the preferred embodiments are provided to enable any persons skilled in the art to make or use the method and system of the present invention. It is further envisioned that the present invention may be employed for range measurements where sound velocity is known. Furthermore, the teachings of the present invention may include applications other than transmission of an acoustical signal through a fluid medium but also electronic signals through the atmosphere. Various modifications to the embodiments disclosed herein will be readily apparent to those skilled in the art, and the generic principles defined herein may be applied to other embodiments without the use of the inventive faculty. Thus, the present invention is not intended to be limited to the embodiment shown herein, but is to be accorded the widest scope consistent with the principles and novel features disclosed herein.

What is claimed:

1. A method for determining a travel time of a signal a predetermined distance comprising the steps of:
    generating a cyclical reference signal;
    transmitting a portion of said reference signal;
    receiving said transmitted reference signal portion, said transmitted reference signal portion traveling a predetermined distance between transmission and reception;
    setting said reference signal to a frequency where said received reference signal portion is in phase with respect to said reference signal;
    counting a number of cycles in said reference signal during a period of time between the transmission and reception of said reference signal portion; and
    dividing said counted number of cycles by said reference signal frequency wherein said counted number of cycles divided by said reference signal frequency is a travel time of said transmitted reference signal portion.

2. The method of claim 1 further comprising the step of dividing said predetermined distance by said travel time to determine a speed of travel of said transmitted reference signal portion over said predetermined distance.

3. The method of claim 1 wherein said transmitted reference signal portion is an acoustical signal and said acoustical signal is transmitted through a fluidic medium.

4. The method of claim 1 further comprising the step of providing means for reflecting said transmitted reference signal portion for receiving of said reflected transmitted portion of said reference signal said reflecting means positioned at a location one-half said predetermined distance from a point of location of transmission and reception of said transmitted reference signal portion.

5. A method for determining a travel time of a signal in a medium comprising the steps of:
    generating a cyclical reference signal having reference frequency;
    transmitting a portion of said reference signal in a medium as a transmitted signal;
    receiving said transmitted signal from said medium, said transmitted signal traveling a predetermined path length in said medium between transmission and reception of said transmitted signal;
    comparing phases of said received transmitted signal and said reference signal;
    adjusting said reference frequency of said reference signal when said received signal and said reference signal are out of phase with respect to one another so that said reference signal and said received transmitted signal are of the same frequency and in phase with respect to one another;
    counting a number of cycles in said reference signal during a period of time between transmission and reception of said transmitted signal; and
    dividing a value corresponding to said counted number of cycles by a value corresponding to said adjusted reference frequency so as to provide a valve corresponding to a travel time of said transmitted signal in said medium.

6. The method of claim 5 wherein said reference signal portion is transmitted in said medium as an acoustical signal and said medium is a fluid.

7. The method of claim 6 further comprising the step of providing means for reflecting said transmitted signal for reception thereof, said reflecting means positioned at a location one-half said predetermined path length from a point of transmission and reception of said transmitted signal.

8. The method of claim 7 further for determining a velocity of said transmitted signal in said medium comprising the step of dividing a value corresponding to said predetermined path length by said value corresponding to said travel time to provide a value corresponding to velocity of said transmitted signal in said medium.

9. A system for determining variables for computing travel time of a signal traveling a known reference distance in a medium, comprising:
  means for generating a reference signal;
  means, coupled to said means for generating, for transmitting a portion of said reference signal as an acoustical signal pulse in a fluidic medium;
  means for receiving said transmitted pulse, said transmitted pulse traveling a known reference distance in said medium between transmission and reception;
  means for setting said reference signal to a frequency where said received pulse is in phase with respect to said reference signal; and
  means coupled to said means for receiving, for counting a number of cycles in said reference signal during a period of time between transmission and reception of said transmitted pulse wherein a travel time of said pulse in said medium is determined by dividing said counted number of cycles by said predetermined frequency.

10. The system of claim 9 wherein said known reference distance divided by said travel time is a speed of said transmitted pulse in said medium.

11. The system of claim 9 wherein said means for setting further comprises:
  means, coupled to said means for generating and said means for receiving, for respectively receiving said reference signal and said received pulse, for comparing phases of said received pulse and said reference signal and providing a difference signal indicative of a phase difference; and
  means responsive to said difference signal for adjusting said reference signal frequency when the phase of said received pulse and the phase of said reference signal are out of phase with respect to one another so as to eliminate a phase difference between a subsequently transmitted pulse, as received, and said reference signal.

12. The system of claim 9 further comprising means for reflecting said transmitted pulse, said means for reflecting positioned at a location one-half said reference distance from a point of location of said means for transmitting and said means for receiving.

13. A method for determining a travel time of a signal a predetermined distance comprising the steps of:
  generating a cyclical reference signal;
  transmitting a portion of said reference signal;
  receiving said transmitted reference signal portion, said transmitted reference signal portion traveling a predetermined distance between transmission and reception;
  setting said reference signal to a frequency where said received reference signal portion is in phase with respect to said reference signal;
  counting a number of cycles in said reference signal during a period of time between the transmission and reception of said reference signal portion; and
  multiplying said counted number of cycles by said cycle period wherein said counted number of cycles multiplied by said cycle period is a travel time of said transmitted portion of said reference signal over said predetermined distance.

14. The method of claim 13 further comprising the step of dividing said predetermined distance by said travel time to determine a speed of travel of said transmitted reference signal portion over said distance.

15. The method of claim 13 wherein said transmitted reference signal portion is an acoustical signal and said acoustical signal is transmitted through a fluidic medium.

16. The method of claim 13 further comprising the step of providing means for reflecting said transmitted reference signal portion for receiving of said reflected transmitted portion of said reference signal, said reflecting means positioned at a location one-half said predetermined distance from a point of location of transmission and reception of said transmitted reference signal portion.

17. A method for determining a travel time of a signal in a medium comprising the steps of:
  generating a cyclical reference signal having a reference frequency with each cycle of said reference signal being of a predetermined period reference frequency;
  transmitting a portion of said reference signal in said medium as a transmitted signal;
  receiving said transmitted signal from said medium, said transmitted signal traveling a predetermined path length in said medium between transmission and reception;
  comparing phases of said received transmitted signal and said reference signal;
  adjusting said reference frequency and corresponding period of said reference signal when said received signal and said reference signal are out of phase with respect to one another so that said reference signal and said received transmitted signal are of the same frequency and in phase with respect to one another;
  counting a number of cycles in said reference signal during a period of time between transmission and reception of said transmitted signal; and
  multiplying a value corresponding to said counted number of cycles by a value corresponding to said period of said adjusted reference frequency so as to provide a value corresponding to a travel time of said transmitted signal in said fluid.

18. The method of claim 17 wherein said reference signal portion is transmitted in said medium as an acoustical signal and said medium is a fluid.

19. The method of claim 18 further comprising the step of providing means for reflecting said transmitted signal for reception thereof, said reflecting means positioned at a location one-half said predetermined path length from a point of transmission and reception of said transmitted signal.

20. The method of claim 18 further for determining a velocity of said transmitted signal in said medium comprising the step of dividing a value corresponding to said predetermined path length by said value corresponding to said travel time to provide a value corresponding to velocity of said transmitted signal in said fluidic medium.

21. A system for determining variables for computing travel time of a signal traveling a known distance in a medium, comprising:
  means for generating a cyclical reference signal;
  means, coupled to said means for generating, for transmitting a portion of said reference signal as an acoustical signal pulse in a fluidic medium;
  means for receiving said transmitted pulse, said transmitted pulse travelling a known reference distance in said medium between transmission and reception;

means for setting said reference signal to a frequency where said received pulse is of a same frequency and in phase with respect to said reference signal; and means, coupled to said means for receiving, for counting a number of cycles in said reference signal during a period of time between transmission and reception of said transmitted pulse wherein a travel time of said transmitted pulse in said medium is determined by multiplying said counted number cycles by said predetermined cycle period.

22. The system of claim 21 wherein said known reference distance divided by said travel time is a spaced of said transmitted pulse in said medium.

23. The system of claim 21 wherein said means for setting comprises:

means, coupled to said means for generating and said means for receiving, for respectively receiving said reference signal and said received pulse, for comparing phases of said received pulse and said reference signal, and providing a difference signal indicative of a phase difference; and means responsive to said difference signal for adjusting said reference signal frequency when the phase of said received pulse and the phase of said reference signal are out of phase with respect to one another so as to eliminate a phase difference between a subsequently transmitted pulse, as received, and said reference signal.

24. The system of claim 21 further comprising means for reflecting said transmitted pulse, said means for reflecting positioned at a location one-half said reference distance from a point of location of said means for transmitting and said means for receiving.

25. The system of claim 21 further for computing travel time from said variables comprising means for multiplying said counted number cycle by said reference signal period.

26. The system of claim 25 further for computing speed of said transmitted pulse in said medium comprising means for dividing said reference distance by said travel time.

* * * * *